May 3, 1960  R. B. JACOBS ET AL  2,935,590
TEMPERATURE CONTROL DEVICE
Filed Jan. 23, 1958  2 Sheets-Sheet 1
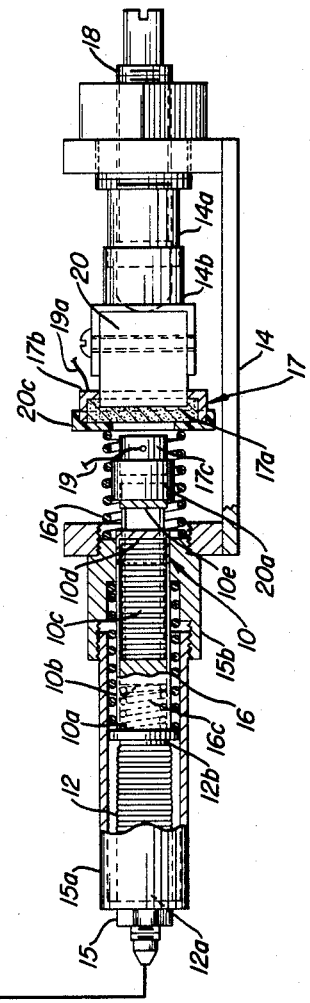
Fig. 1
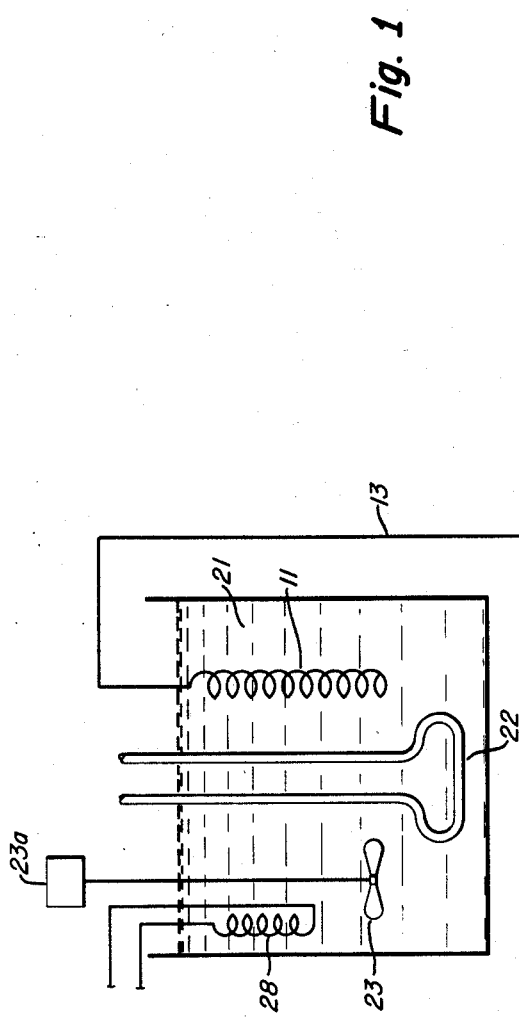
INVENTORS:
Robert B. Jacobs
Joseph C. Rhodes
BY  Everett A. Johnson
ATTORNEY

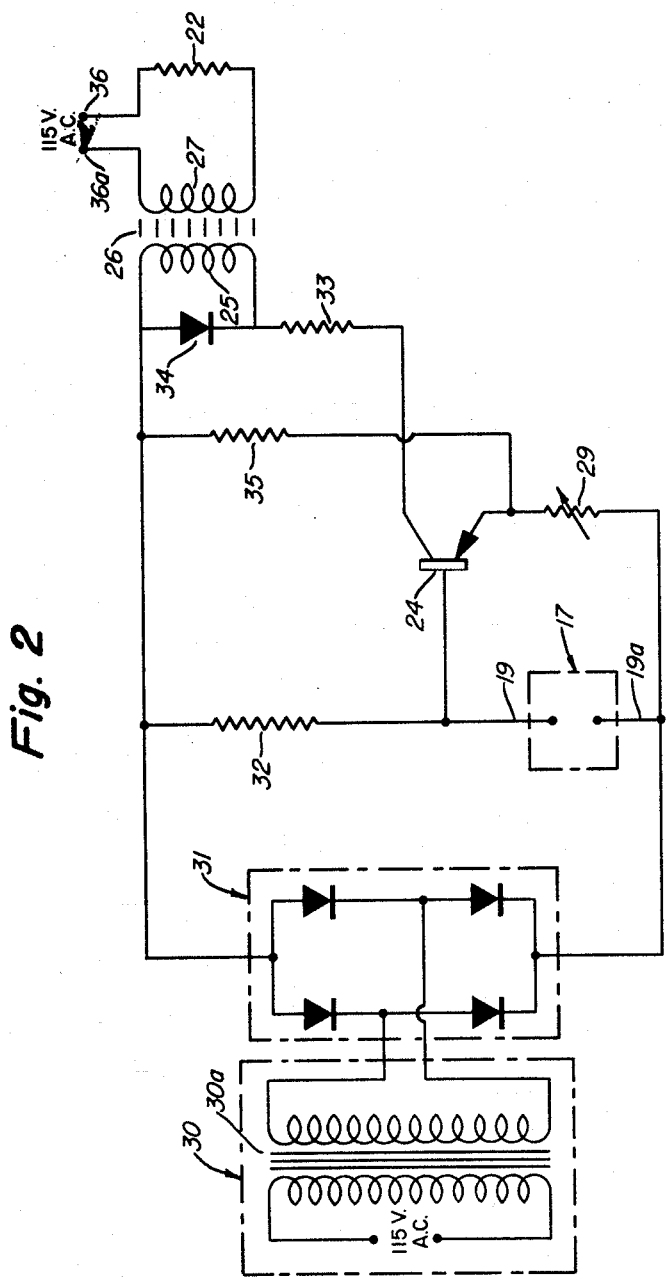

2,935,590

TEMPERATURE CONTROL DEVICE

Robert B. Jacobs, Homewood, and Joseph C. Rhodes, Park Forest, Ill., assignors to Standard Oil Company, Chicago, Ill., a corporation of Indiana Application January 23, 1958, Serial No. 710,687

7 Claims. (Cl. 219—20)

This invention relates to temperature sensing and control devices useful in controlling heated units to a precise temperature. In particular the invention relates to a system for controlling the temperature of baths in instruments where correct temperatures are of primary importance.

The performance of a controller in maintaining a constant temperature depends upon the sensitivity and the stability of the apparatus. Devices which are now commercially available have been found unsatisfactory for various reasons. Invariably these devices compromise between durability and sensitivity or substitute durability for sensitivity, no known device being satisfactory in both respects. In particular it has been found that sensitive controllers with electrical contacts have very limited life expectancy under normal use. Electronic devices which do not employ electrical contacts are subject to the limitations of electronic tubes so far as reliability, life expectancy, etc. are concerned.

It is therefore a primary object of this invention to provide a durable temperature controller with very high sensitivity and stability. Another object of the invention is to provide an apparatus to control the temperature of baths in instruments. A further object of the invention is to provide a controller which is adapted to seek the correct power output for a heater for any given load condition and to maintain this power output without variation. It is also an object of the invention to provide a controller wherein for constant load conditions there is no motion of mechanical parts and no electrical contacts making or breaking. These and other objects of our invention will become apparent to those skilled in the art as the description thereof proceeds.

Briefly the temperature sensing means involves a liquid filled system comprising a coil or bulb connected through capillary tubing to a bellows and a pressure-sensitive electrical resistance cell biased against the free end of the bellows in such a way that an increase in bath temperature decreases the resistance of the cell. The cell is connected in a circuit including a transistor in series with the control winding of a saturable core reactor. The decreased resistance of the cell reduces the current flow through the transistor and the reduced winding current increases the reactor coil impedance which serves to reduce proportionally the current to an electrical heater. A high sensitivity with excellent stability and durability is obtained.

Further advantages and details of the apparatus will be described by reference to the accompanying drawings wherein:

Figure 1 is a schematic diagram of the controller applied to a constant temperature bath; and Figure 2 is a circuit diagram adapted for use with the apparatus of Figure 1.

Referring to Figure 1, the temperature sensing system provided according to our invention comprises a coil 11 of tubing of suitable length and cross-sectional area to provide the necessary volume of liquid to actuate a bellows 12 through the capillary tubing 13. For example, the coil 11 may comprise about 4 feet of ⅛ or 3/16 inch tubing with the capillary tubing 13 having an inside diameter of about 0.010 inch and of any convenient length.

The entire system is filled with a liquid having a large temperature coefficient of expansion. Ether has been found quite suitable for this use but other liquids such as xylene may be used. The end 12a of the bellows 12 which is connected to the capillary tubing 13 is rigidly mounted to a fixture 14 by nut 15, the bellows housing shell 15a, and adapter 15b. The free end 12b of the bellows 12 is biased by spring 16 in compression to insure that no vapor space is formed within the liquid filled system. A change in temperature of the liquid in coil 11 causes a hydraulic displacement of the free end 12b of the bellows 12. A considerable force is exerted by the bellows 12 if the displacement is resisted.

Mounted on the free end of 12b of the bellows 12 is an ambient temperature compensating device 10 which consists of two rectangular links having ends 10a, 10b, 10d and 10e and a bellows 10c. The two links are interlocked and the bellows placed between their inside ends 10b and 10d in such a manner that expansion of the bellows 10c decreases the distance between the ends 10a and 10e. The end 10a is attached to the free end 12b of the bellows 12 and the spring 16c holds the ends 10b and 10d tight against the bellows 10c. Changes in ambient temperature cause expansion of the liquid in the capillary tube 13 and the two bellows 12 and 10c. There is a resulting displacement of the free end 12b, but this is compensated by an equal and opposite displacement so that the position of the end 10e is not altered by a change in ambient temperature.

On the fixture 14 to which the end 12a of the bellows 12 is attached is a hollow cylindrical guide tube 14a through which positioning screw 18 passes. Another cylindrical tube 14b is placed so that it is free to slide over the guide tube 14a. On one end of the tube 14b is attached an electrical insulation block 20 which is used to support electrical resistance cell 17 which is filled with a material 17a whose electrical resistance is proportional to the force exerted thereon. The insulator block 20 can be displaced axially with respect to the free end of the bellows 12b of the bellows 12 by turning adjusting screw 18. Between the end of the compensator 10e and the resistance cell 17 is a contactor 17c which is mechanically attached to the compensator end 10e by electrical insulator 20a. Two lead wires 19 and 19a are connected to the contactor 17c and the cell base 17b in such a manner that they are in series with the cell material 17a. The spring 16a is used to hold the cell 17 in position and to apply tension to the positioning screw 18. The spring 16a is electrically insulated from the cell 17 by insulator 20c.

The coil 11 is disposed within a bath 21 containing the electrical heater 22 and the stirrer 23. The heater 22 is controlled by the circuit illustrated in Figure 2. An increase in the temperature of bath 21 causes the liquid in coil 11 to displace the free end 12b of the bellows 12 thereby exerting a force on the cell material 17a and reducing the electrical resistance of the cell 17 connected in the electrical circuit of Figure 2. This reduction in electrical resistance reduces the current flow through a transistor 24 connected in electrical series with the control winding 25 of a saturable core reactor 26. The reactor coil 27 is in electrical series with the heater 22. Electrical power is supplied at terminals 36 and 36a. The reduction of current flow through the control winding 25 of the reactor 26 causes the impedance of the reactor coil 27 to increase and thus reduces the current flow through the heater 22 and decreases its power output. In this way the heat supplied by heater 22 to the bath 21 is proportioned, The sensitivity and range of the control device are determined by (a) the volume of the liquid filled coil 11, (b) the cross-sectional area of the bellows 12, (c) the characteristics of the resistance material 17a in the cell 17, and (d) the control circuitry of Figure 2. By selection of these components the device can be made to have the desired sensitivity.

Other variables than the sensitivity of the controller affect the precision with which baths can be controlled. Some of these variables are (a) stirring rates, (b) maximum capacity of the heater 22, (c) volume of the bath 21, (d) characteristics of the bath liquid, (e) range of loads on the bath 21, (f) ambient temperature, and (g) the geometrical arrangement of the heater 22, the coil 11 and the stirrer 23.

In a typical application a 400 watt heater 22 is used to control a bath 21 with a 12 qt. capacity and a stirrer 23 driven by a 1/20 H.P. motor 23a at 1725 r.p.m. The maximum load on the bath 21 comprises a flow of gasoline through coil 28 at 60 cc./min. and at an initial temperature of about 50° F. The bath 21 is maintained at a temperature of within 0.1° F. of 140° F.

The following data in Table I are typical of that found when measuring the resistance of the cell vs. the temperature of a well stirred bath and a sensing device similar to that shown in Figure 1.

Table I

| Temp. (°F.): | Resistance (ohms) |
| --- | --- |
| 100.4 | 5.2 |
| 100.2 | 5.7 |
| 100.0 | 7.6 |
| 99.9 | 9.1 |
| 99.8 | 14.3 |
| 99.7 | 21.0 |
| 99.6 | 80.0 |
| 99.55 | 2100.0 |

By proper setting of the adjusting screw 18 in Figure 1 and of the variable resistor 29 in Figure 2, the device can be made to control for example at 99.8° F. An increase in temperature to 99.9° F. will decrease the power output of the heater 22 to less than 40 watts and a decrease to 99.6° F. will increase the power output of the heater 22 to over 360 watts.

It has been found that proper placement of the coil 11 with respect to the heater 22 results in a performance in which the controller system will seek the correct power output for the heater 22 for any given load condition and maintain this power output without variation. If the load changes, the controller seeks the new level of power output for the heater 22. Thus at control for constant load conditions there is no motion of mechanical parts and no electrical contacts which make or break.

Referring to Figure 2 the control circuit includes the power source 30 comprising a transformer 30a supplying 32 volt A.C. current to the selenium rectifier stack 31. The D.C. output of the rectifier 31 is applied across the pressure sensitive resistance cell 17 through fixed 100 ohm resistance 32. The transistor 24 feeds the primary winding 25 of the saturable core reactor 26 through fixed 10 ohm resistance 33 and variable resistor 29. In order to allow for the variations in pressure sensitive cells 17 we provide a variable resistance 29 between the cell 17 and the transistor 24. Rectifier 31 is in parallel with the control winding 25 and protects the transistor 24 from high voltage surges when the current through the control winding 25 is reduced suddenly.

For a typical cell 17 a resistance of 10 ohms will cause the heater 22 to turn full off and 80 ohms will cause the heater 22 to turn full on. Fixed 150 ohm resistance 35 provides a bias on resistance 29 when no current flows through control winding 25. It will be apparent that decreasing the current through the control winding 25 (typically having a resistance of 32 ohms) will decrease the current passing through the secondary winding 27 of the saturable core reactor 26 to the 400 watt (at 120 volts) heater 22.

Although the preferred form of current amplifying means comprises a solid-state means such as transistor 24, other means, e.g., a vacuum tube, magnetic amplifier, etc., may be substituted. However, a transistor is preferred for field installations requiring an explosion proof enclosure, since it has low heat dissipation and long life. In using a tube in place of the transistor, minor adjustments in the circuit, that will be obvious to one skilled in the art, would be made. For example, a filament transformer would be used to supply current to the tube filament and the power source 30 would be altered accordingly.

Our invention has been described with respect to the control of bath temperature, but the device can be used for many other systems where temperature control is important. For example, the device has been used to control the temperature of a cylindrical metal block which has a diameter of 2 inches and a height of 4 inches. In this modification of the apparatus, the sensing coil 11 is replaced by a bulb which is 3 inches long, has an outside diameter of 5/8 inch and a wall thickness of 1/16 inch. The power requirement is much less than that of a bath and if desired the saturable core reactor 26 may be eliminated and the transistor 24 used to control power to a heater 22 which is substituted in the circuit of Figure 2 for the control winding 25 of the saturable core reactor 26.

The device can also be used to control the temperature of ovens, of pilot plant processes such as petroleum distillation towers, room temperatures where close control is desired, or on most applications where dependable proportional control is desirable.

Accordingly it will be understood that the specific embodiment of the invention described in some detail and illustrated in the drawings is by way of example only and that the invention is not necessarily limited thereto. Other modifications will become apparent to those skilled in the art and such modifications are contemplated as coming within the scope of our invention.

What we claim is:

1. Temperature controller system including an expansible temperature sensing means, electrical heater means, control circuit means for said heater, said control circuit means including a pressure sensitive resistance cell means having an output current and being arranged to be actuated by expansion of said temperature sensing means, means for amplifying the output current from said cell means, and a saturable core reactor in series with said heater.

2. A temperature controller comprising in combination a liquid filled extendable temperature sensing means including a fluid actuated bellows, one end of said bellows being movable, control circuit means, said circuit means including pressure-sensitive resistance cell means arranged to be affected by movement of said bellows, solid-state current amplifying means in said circuit means, an electrical heater to be controlled, and a saturable core reactor in series with said heater and controlled by said circuit means.

3. Temperature controller apparatus comprising in combination liquid-filled temperature sensing means, said means including a bellows having a free end thereof displaceable by thermal expansion of said liquid, an electrical heater means, transistor control circuit means for controlling said heater, pressure sensitive resistance cell means in said circuit, and saturable core reactor means in series with said heater and controlled by said cell means, said cell means being in turn actuated by said bellows.

4. Constant temperature bath means with automatic control system comprising in combination a liquid bath, an electrical heater for said bath, liquid filled coil means disposed in said bath, extendable bellows means in fluid communication with said liquid filled coil means, a fixture supporting one end of said bellows, transistor circuit means for controlling the electrical power to said electrical heater, said circuit means including a control winding of a saturable core reactor, the reactor coil of such core reactor being in series with said electrical heater, and pressure sensitive resistance cell means in said circuit fixedly supported by said fixture in opposition to the extension of said bellows.

5. A bath temperature sensing and controlling means comprising a liquid filled system including a bath-immersed coil connected through capillary tubing to a liquid filled bellows having a free end and a pressure sensitive electrical resistance cell biased against the free end of the bellows so that an increase in bath temperature expands the liquid to extend the bellows and thereby decreases the resistance of the cell, such decrease reducing current flow through a transistor in series with the control winding of a saturable core reactor to decrease the heat input to said bath.

6. A durable temperature controller of high sensitivity and stability which comprises a liquid filled system including a liquid reservoir of substantial volume adapted to be immersed in a bath to be controlled, a bellows means supported exterior of said bath and actuated by expansion of liquid in said reservoir, an electrical circuit means including a supported pressure sensitive electrical resistance cell means, transistor means, and the control winding of a saturable core reactor, said saturable core reactor having its reactor coil in a separate electrical circuit in series with the power supply to an electrical heater, and said pressure sensitive electrical resistance cell means being biased against a free end of the said bellows whereby an increase in bath temperature decreases the resistance of the said cell to reduce current flow through said transistor and through said control winding of the saturable core reactor thereby reducing the electrical heater current proportionally.

7. In a temperature controller the improvement which comprises a U-shaped fixture having a pair of substantially parallel arms, bellows means arranged between said arms and having one end fixed to one of said arms, a pressure sensitive electrical resistance cell supported between said arms in opposition to the force exerted by the free end of said bellows when expanded, an adjusting screw means fixed to another of said arms and supporting said cell in contact with the free end of said bellows, a sealed hydraulic expansion system connected to said bellows, said system comprising a liquid reservoir and a capillary tube communicating between said reservoir and said bellows, an electrical heater system including an electrical resistance heater and a saturable core reactor, the reactor coil of said core reactor being connected in series with said electrical resistance heater, and electrical control circuit means including a power source, said pressure sensitive resistance cell, transistor means, and the control winding of said saturable core reactor, whereby changes in the temperature ambient to said reservoir displaces said bellows so as to exert pressure on said cell and change the resistance thereof, this change in resistance altering the current flow through the transistor to alter the impedance of the reactor coil to control the heater current proportionally.

References Cited in the file of this patent

UNITED STATES PATENTS

| | | |
|---|---|---|
| 2,357,099 | Gaugler | Aug. 29, 1944 |
| 2,426,663 | Bevins | Sept. 2, 1947 |
| 2,488,422 | Mershon | Nov. 15, 1949 |
| 2,493,040 | Sopcak | Jan. 3, 1950 |
| 2,494,621 | Jones | Jan. 17, 1950 |
| 2,690,489 | Jarret et al. | Sept. 28, 1954 |
| 2,769,076 | Bogdan | Oct. 30, 1956 |
| 2,814,198 | Howland | Nov. 26, 1957 |
| 2,824,942 | Engelhardt et al. | Feb. 25, 1958 |
| 2,872,556 | Obermaier | Feb. 3, 1959 |
| 2,876,327 | Leisey | Mar. 3, 1959 |

OTHER REFERENCES

Ogle: General Electric Review; vol. 53; No. 10, October 1950, pp. 41–46.